Jan. 21, 1964     E. B. MARJORAM ETAL     3,118,360
CAMERA ASSEMBLY
Filed Nov. 7, 1961     5 Sheets-Sheet 1
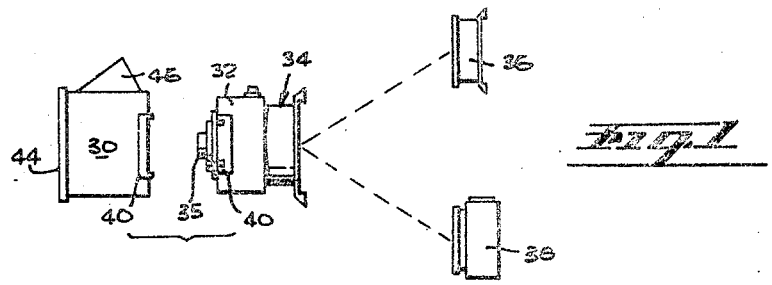
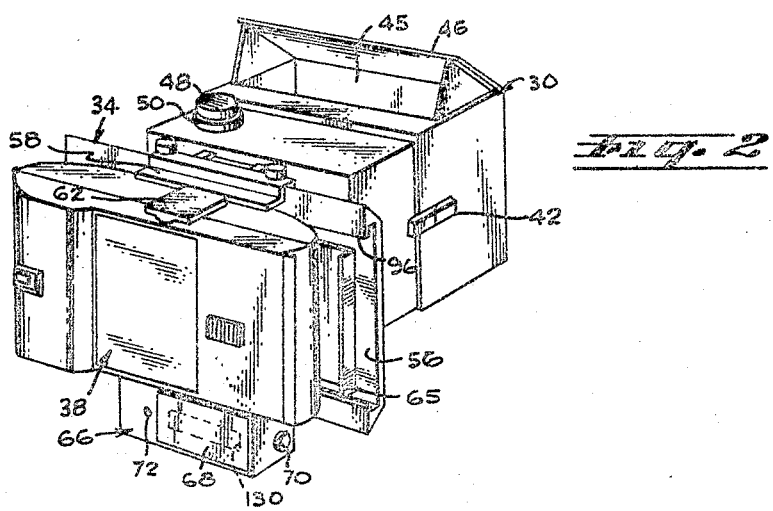
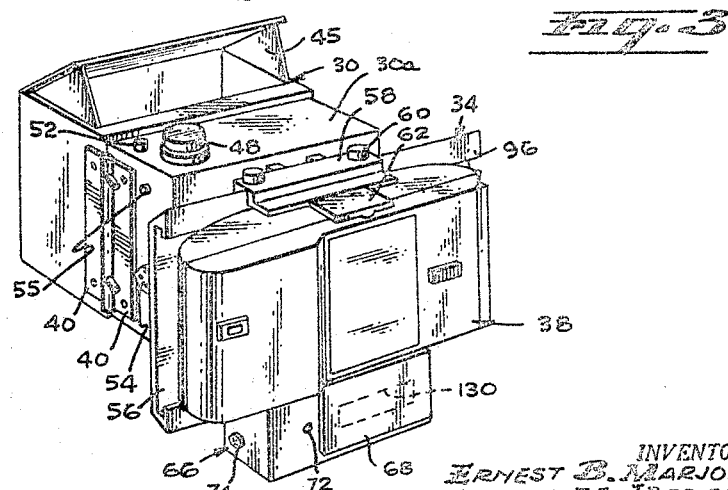
INVENTOR.
ERNEST B. MARJORAM
ARTHUR M. HEDGLIN
BY
ATTORNEY

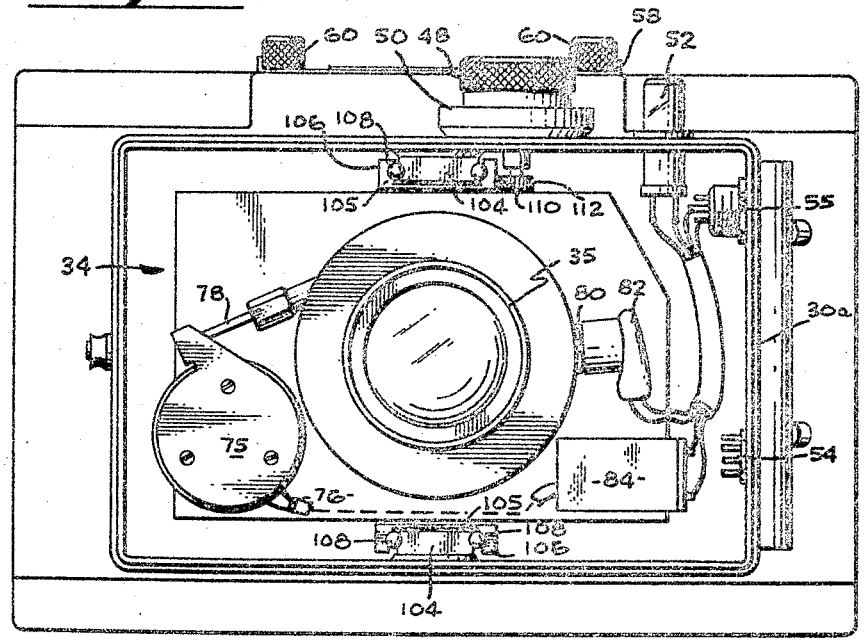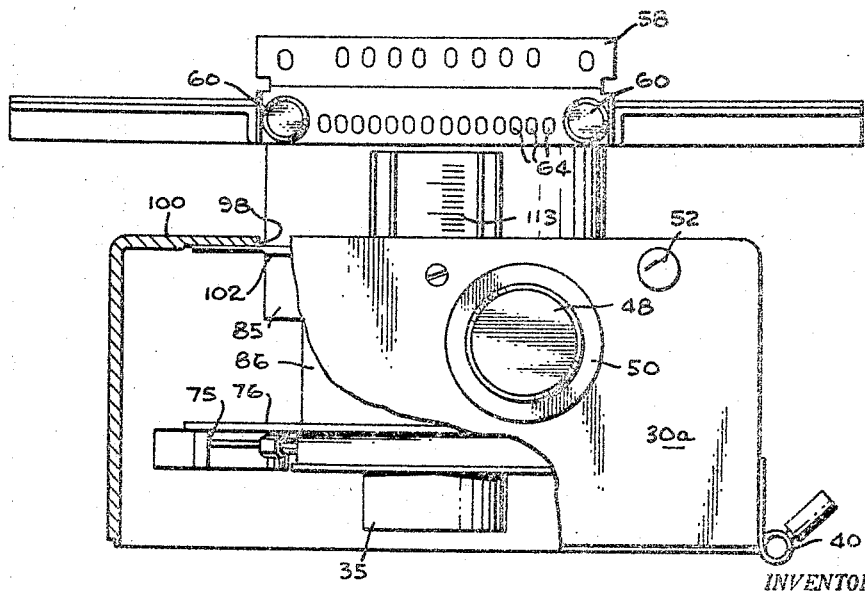

Jan. 21, 1964  E. B. MARJORAM ETAL  3,118,360
CAMERA ASSEMBLY
Filed Nov. 7, 1961  5 Sheets-Sheet 3
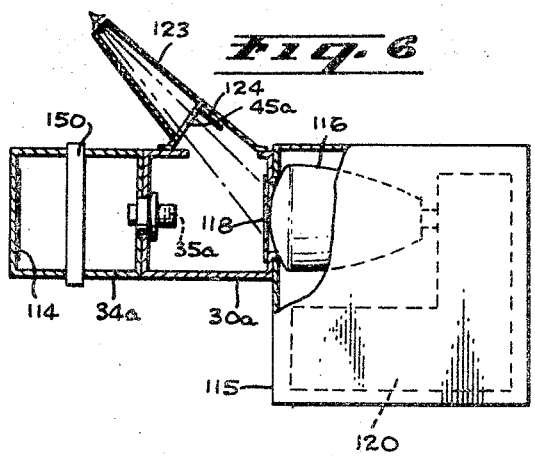
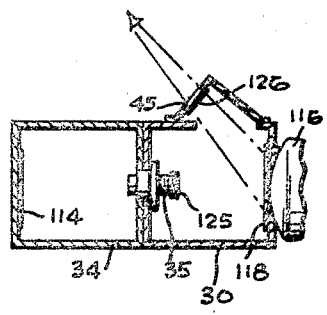
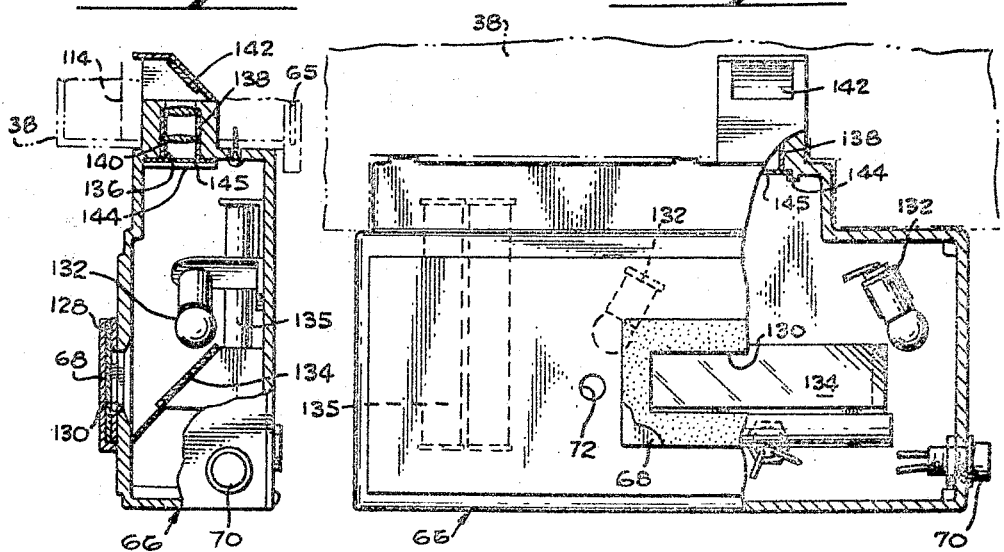
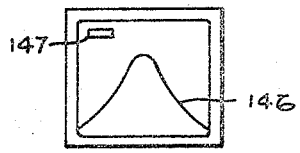
INVENTORS
ERNEST B. MARJORAM
ARTHUR M. HEDGLIN
BY
Jos G M Roberts
ATTORNEY Jan. 21, 1964     E. B. MARJORAM ETAL     3,118,360
CAMERA ASSEMBLY
Filed Nov. 7, 1961     5 Sheets-Sheet 4
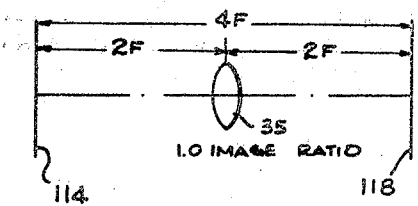
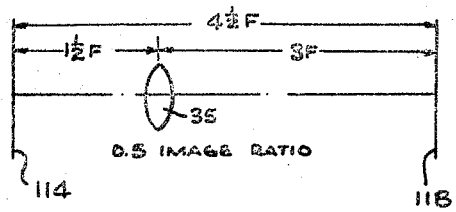
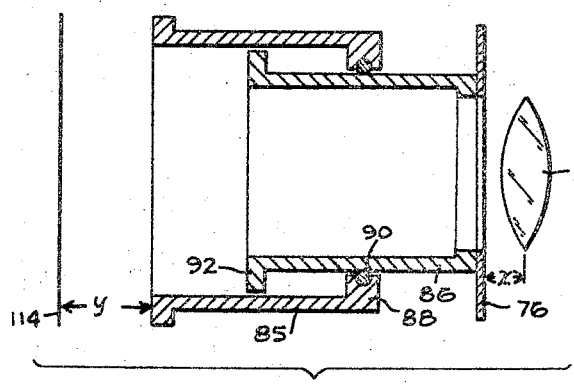
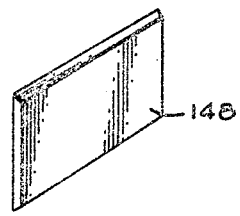
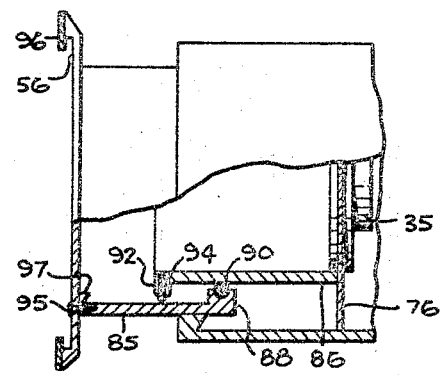
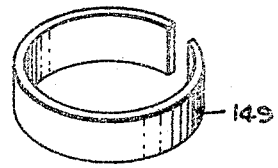
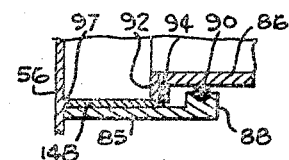
INVENTORS
ERNEST B. MARJORAM
ARTHUR M. HEDGLIN
BY
ATTORNEY Jan. 21, 1964          E. B. MARJORAM ETAL          3,118,360
                         CAMERA ASSEMBLY
Filed Nov. 7, 1961                              5 Sheets-Sheet 5
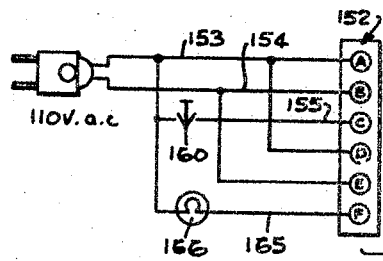
*Fig. 19*
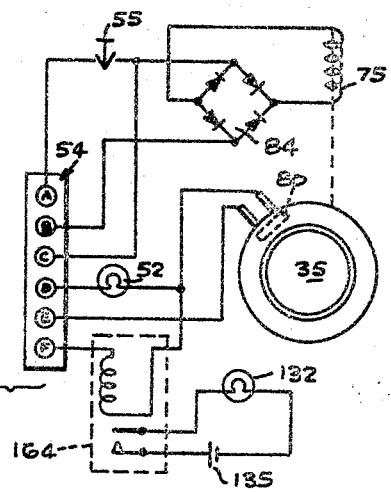
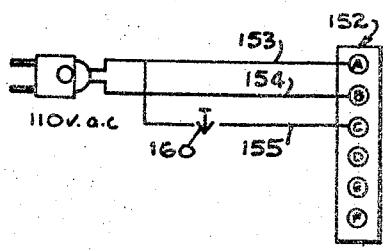
*Fig. 20*
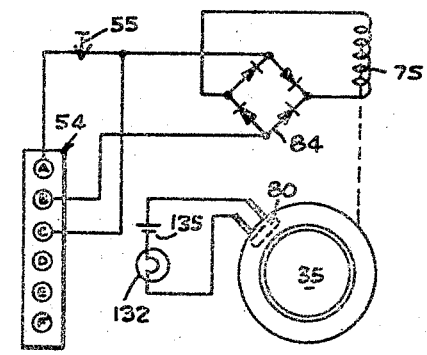
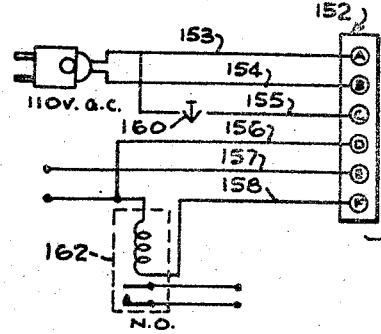
*Fig. 18*
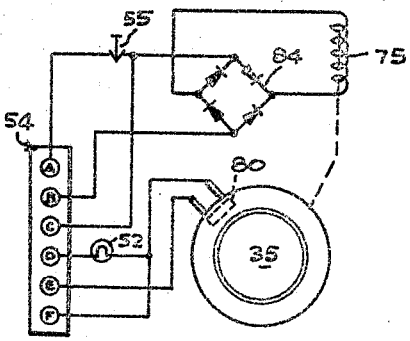
INVENTORS
ERNEST B. MARJORAM
ARTHUR M. HEDGLIN
BY
Jacob M Roberts
ATTORNEY

United States Patent Office 3,118,360
Patented Jan. 21, 1964

3,118,360
CAMERA ASSEMBLY
Ernest B. Marjoram, West Covina, and Arthur M. Hedglin, Fullerton, Calif., assignors to Beattie-Coleman, Inc., Anaheim, Calif., a corporation of California
Filed Nov. 7, 1961, Ser. No. 150,696
9 Claims. (Cl. 95—45)

This invention relates to photographic recording of cathode-ray tube (CRT) traces and, more particularly, pertains to improvements in a camera assembly for use with a cathode-ray tube. Typically such an assembly comprises a camera with a removable film adapter and a housing or dark box which encloses the space between the camera and the CRT screen. Since the housing is clamped to the CRT to support the camera, it is commonly termed a clamp housing.

One of the problems to which the invention is directed arises from the necessity of providing a viewing port in the clamp housing for the purpose of observing phenomena on the CRT screen, the problem being to prevent ambient light from causing loss in quality in the film image of the CRT phenomena. Degradation of the film image arises from two causes, first, reduction in contrast of the CRT image itself by ambient light and, second, fogging of the film in the camera by ambient light and ambient light reflections inside the clamp housing. In addition to ambient light entering the viewing port, light is created within the assembly itself by the electronic components of the CRT.

Orange or green filters are commonly placed across the CRT screen and have also been placed across the viewing port. Such an arrangement is of only limited utility, however, and permits the viewing port to be open only for brief periods without seriously affecting the quality of the photographs.

The present invention solves this problem by using two polarizing filters that polarize light in opposite or canceling respects. One polarizing filter is placed across the viewing port and the other is placed at the camera lens. It has been found by tests that a safe ratio between the illumination of the CRT screen and the environmental or ambient light for exposures up to five seconds is 1000 to 1. At this ratio the film produces a satisfactory image of the CRT screen without the ambient light reaching the threshold of response of the film. Using a pair of 32% transmission linear polarizing filters with their polarizing axes at right angles for maximum extinction produces a ratio of 6000 to 1. A pair of 22% transmission filters results in 0.0005% extinction and produces a ratio of 44,000 to 1. The two polarizing filters not only permit the viewing port to be open for long periods of time but also make it possible to eliminate the usual "periscope". The viewing port may be large enough for observing the whole area of the CRT screen and more than one person can view the CRT phenomena simultaneously.

A second problem to which the invention is directed is to print on the margin of the film in the camera data that is pertinent to the photographed CRT phenomena.

In one prior art arrangement, the image of an illuminated data card is projected by an optical system onto a blank projection card that is adjacent the CRT screen and the projection card and the CRT screen are photographed simultaneously. A troublesome disadvantage of this arrangement is the exposure problem of balancing the intensities of the data card image and the CRT image. Another disadvantage is the focusing problem created by the separation between the plane of the projection card and the plane of the CRT image.

In a more recent prior art arrangement a mirror positioned in front of the CRT screen is substituted for the projection card to reflect the image of the data card into the camera. With the mirror in position one exposure is made of the data card and with the mirror swung out of the way a separate exposure is made of the CRT screen. Here again, even though the data card and the CRT screen are photographed by separate exposures, there is the problem of balancing the intensity of the data card image and the intensity of the CRT screen image. Another disadvantage is that the optical system between the data card and the mirror must be refocused each time the camera is refocused and there is always the possibility that the data optical system will be inadvertently out of focus. A further disadvantage is the problem of parallax, the location of the data image on the film shifting with changes in focus of the camera. Added to these disadvantages is the necessity of repeatedly manipulating the mirror and the possibility of neglecting to swing the mirror out of the way when the CRT screen is to be photographed.

The present invention eliminates these difficulties by providing a small data recording chamber that is slotted to receive data cards and is positioned adjacent the film in fixed relation to the film. The data chamber encloses lamp means under control of a switch to illuminate the inserted data card and also encloses an optical system to project the data image onto the margin of the film. The optical system includes two mirrors and thereby avoids the inversion of the data image that is unavoidable in the two prior art arrangements.

There is no exposure problem since closing the switch for the correct period of time always produces a data image of the desired intensity. Since the data is not photographed through the lens of the camera and the optical distance between the data card and film is constant, there is no parallax problem and no focusing problem, it being impossible to get the data image out of focus by inadvertence.

In the preferred practice of the invention the usual dark slide of the film adapter is positioned far enough forward for all of the data printing optical system to lie behind the dark slide. This arrangement makes it possible to incorporate the data recording chamber into the construction of a film adapter. Any necessity for excessive spacing of the dark slide from the film is avoided by placing the data chamber completely outside the film adapter with only a relatively narrow periscope extending from the data chamber into the film adapter.

A third problem to which the invention is directed is provision for camera adjustment to get film images of different sizes relative to the CRT screen image. A ratio of 1.0 between the film image and the CRT graticule may be desired for a full size image on a 4" by 5" film or a ratio of 0.9 for an image of maximum size on a 72 mm. by 96 mm. film. In other instances ratios of 0.7 and 0.5 are desired to obtain multiple images on a single film frame.

Since the relative size of the film image is varied by varying the distance of the lens from the film, it would seem that the required range of adjustment from 1.0 to 0.5 could be obtained simply by using a bellows type camera that can be freely extended and contracted between wide extremes. It has not been feasible to use such a bellows type camera, however, because of complications involved in providing necessary additional support structure for the camera lens board. Only a rigid camera body construction is acceptable in combination with a rigid camera-supporting clamp housing.

Heretofore no rigid camera body structure used for oscilloscope recording in combination with a clamp housing has been capable of extension over the range required for image ratios from 1.0 to 0.5 with a standard 75 mm. lens. Consequently various expedients have been developed to solve the problem.

One solution heretofore suggested is the provision of interchangeable lenses of different focal lengths. For example a 75 mm. lens may be used for a 1.0 ratio, a 73 mm. lens for an 0.9 ratio, a 72 mm. lens for an 0.7 ratio, and a 67 mm. lens for an 0.5 ratio. The most prevalent prior art solution is to provide so-called spacers or separate body sections for insertion to increase the distance between the camera lens and the film, there being a set of such spacers of different dimensions to be inserted selectively for producing selected image ratios. Neither of these prior solutions is fully satisfactory because of the necessity of keeping a set of accessories available and because of the possibility of damaging, mislaying or losing one of the accessories. Another disadvantage is that no intermediate image ratios are possible.

It is fundamental that the telescoping parts of the camera body structure must have sufficient overlap for the required rigidity when the camera is fully extended. The dimension available for this overlap is found by subtracting a number of dimension increments from the film-to-lens distance required for a 1.0 image ratio. It is because the residual dimension available for minimum overlap of the telescoping parts is so scant that the sets of accessory lenses and spacers have heretofore been employed to solve the problem.

The present invention solves this problem by employing two telescoping cylindrical camera body sections of such cooperating construction as to provide the required rigidity with the limited available dimension for minimum overlap of the two body sections. The rearward of the two sections carries the film adapter and is adjustably mounted on the clamp housing by a longitudinal track means. The rearward section has an inner radial flange on its forward end surrounding the forward section and the forward section has an outer radial flange on its rear end surrounded by the rearward section, these two flanges meeting when the camera is fully extended for a 1.0 image ratio. In the preferred construction a light seal is associated with one of the two radial flanges and releasable means to interconnect the two body sections fixedly at adjustments for various image ratios is associated with the other radial flange.

Index marks may be provided on one of the two body sections for guidance in making adjustments for the different image ratios. In the preferred practice of the invention, however, adjustment aids in the form of spacer gages are provided for this purpose. Such a spacer gage is backed against an inner circumferential shoulder of the rearward outer body section and then the forward inner body section is backed against the spacer gage to place the two sections accurately at the relative positions required for a selected image ratio.

In the preferred practice of the invention accurate axial alignment of the two cylindrical body sections is facilitated at each of the adjustments for the four image ratios 1.0, 0.9, 0.7 and 0.5. At the 1.0 ratio adjustment, the two radial flanges of the two body sections meet to maintain the desired relative alignment. At the 0.5 ratio adjustment the forward inner section backs against an inner circumferential shoulder of the rearward outer section to maintain the relative alignment. At the intermediate ratio adjustments the spacer gages cooperate with the two body sections to maintain the relative alignment.

A further advantage of the use of spacer gages is that they are trapped in cooperating abutment with both of the two body sections to contribute to the rigidity of the sectionalized camera body. In one practice of the invention, the spacer gages comprise a set of two split cylindrical members which are especially advantageous for promoting rigidity. In another practice the spacer gages comprise a pair of small rectangular plates for use at diametrically opposite locations on the camera, the short dimension of the plates being used for the 0.7 image ratio and the long dimension being used for the 0.9 image ratio.

Finally the invention is directed to the problem of making the camera highly flexible with respect to control. For a wide range of usefulness the camera should be adaptable for remote exposure control as well as for exposure control at the camera. The camera should also be adapted for synchronization of the exposure with action remote from the camera. Provision should be made for both a remote exposure indicator and an exposure indicator at the camera. In addition the camera should be adaptable for exposure of the film and exposure of the data simultaneously by a single control, the single control being either a remote control or a control at the camera.

As will be explained this problem is solved by a number of provisions. A multiple element electrical connector fitting is mounted on the camera for use with a separate complementary multiple element fitting for connecting exterior wiring to the camera. The camera shutter is provided with an actuating solenoid under the control of an exposure switch on the camera. The camera shutter, in turn, operates a second switch mechanically and the second switch may be used either for controlling the data exposure or for remote control of an action that is to be photographed.

The various features and advantages of the invention may be understood by reference to the following detailed description and the accompanying drawings.

In the drawings, which are to be regarded as merely illustrative:

FIG. 1 is a diagrammatic side elevational view of the parts of a camera assembly including a camera with two interchangeable film adapters and a clamp housing for mounting the camera on an oscilloscope tube;

FIG. 2 is a perspective view of the assembled parts from a rear point to one side of the assembly;

FIG. 3 is a similar perspective view from a rear point on the other side;

FIG. 4 is a front elevation of the camera showing the lens, the shutter solenoid and associated wiring;

FIG. 5 is a plan view of the camera and an associated portion of the clamp housing with a portion of the clamp housing broken away;

FIG. 6 is a diagrammatic sectional view of a conventional camera assembly to make clear the problems involved;

FIG. 7 is a diagrammatic sectional view showing how the invention provides a pair of polarizing filters or screens to make possible the elimination of the usual periscope on the clamp housing and to make it possible to keep the viewing port open for long periods of time;

FIG. 8 is a sectional view of a film adapter and the data recording chamber that is incorporated into the construction of the film adapter;

FIG. 9 is an elevation of the data chamber with portions broken away;

FIG. 10 is a face view of a film frame on a reduced scale showing how the data is printed on the margin of the film;

FIG. 11 is a diagram showing the dimensional relationships required for an image ratio of 1.0;

FIG. 12 is a similar diagram showing the dimensional relationships required for an image ratio of 0.5;

FIG. 13 is a diagrammatic representation of the two telescoped camera body sections indicating the dimensions that must be subtracted to arrive at the residual dimension available for overlap of the camera body sections when the camera is fully extended;

FIG. 14 is a diagrammatic view largely in longitudinal section and partly in side elevation showing the sectionalized camera body;

FIG. 15 is a perspective view of one of a pair of rectangular spacer gages that may be used for adjusting the sectionalized camera body for specific image ratios;

FIG. 16 is a fragmentary sectional view showing one of the rectangular spacer gages installed in the sectionalized camera body for an image ratio adjustment;

FIG. 17 is a perspective view of an alternate spacer gage in the form of a split cylindrical member; and FIGS. 18, 19 and 20 are wiring diagrams illustrating the versatility of the camera with respect to modes of control.

GENERAL DESCRIPTION

FIG. 1 shows the separate parts of the assembly comprising a clamp housing 30, an auxiliary clamp housing 32 which may be regarded as a removable section of the clamp housing 30, camera body 34 mounted for longitudinal movement in the auxiliary clamp housing and having a forward lens 35, a 4 x 5 cut film adapter 36 for mounting on the camera body and a roll film adapter 38 that is interchangeable with the cut film adapter. The auxiliary clamp housing 32 that carries the camera body 34 is adapted for attachment to the clamp housing 30 by a separable hinge 40 and a pivoted latch 42 that is best shown in FIG. 2.

FIGS. 2 and 3 show the parts of the sssembly connected together including the roll film adapter 38. This unitary assembly is adapted for mounting on the bezel of an oscilloscope by means of the clamp ring 44 shown in FIG. 1. As shown in FIGS. 2 and 3, the clamp housing 30 has a viewing port 45 which is provided with a hood 46. The auxiliary clamp housing 32 is provided with a focus knob 48 that may be rotated to shift the camera body 34 longitudinally for focus adjustment and a lock ring 50 associated with the focus knob may be tightened to hold the camera body at any selected focus adjustment.

The auxiliary clamp housing 32 is provided with an indicator lamp 52 to indicate when the camera shutter is open. In addition the auxiliary clamp housing 32 is provided with a multiple element pin connector 54 that mates with a complementary multiple element socket connector to connect the camera with exterior wiring. The auxiliary clamp housing 32 is further provided with a push button exposure switch 55 which controls the shutter mechanism of the lens 35.

The rear end of the camera body 34 forms a transverse channel 56 for sliding engagement with the roll film adapter 38. When the camera is adjusted for a low ratio film image a number of images may be photographed on the same film frame by shifting the film adapter 38 relative to the camera body in a step by step manner. For guidance in this procedure an index plate 58 is removably mounted on the camera body by a pair of thumb screws 60 for cooperation with a spring latch 62 on the film adapter. The spring latch 62 comprises a folded leaf spring with a detent lug (not shown) that selectively engages small index apertures 64 (FIG. 5) in the index detent plate.

The film adapter 38 is provided with the usual dark slide 65 that is removed for exposure and is replaced whenever the film adapter is removed from the camera. The film adapter 38 is further provided with a data record chamber 66 that is mounted on a side wall of the film adapter and is of slotted construction to receive a data card. In the construction shown a data card is slipped behind a flexible metal plate 68 that covers a narrow rectangular window in the back wall of the chamber.

The data record chamber 66 is further provided with a push button switch 70 for energizing lamps inside the chamber to illuminate the data card and a pair of small indicator windows 72 reveal to the operator when such illumination occurs for exposure of the data. In addition, the data record chamber 66 is provided with a multiple pin connector fitting 74 for connection to control circuits when desired.

As shown in FIG. 4 a rotary solenoid 75 mounted on the lens board 76 of the camera actuates the lens shutter mechanism by means of a plunger 78. The shutter mechanism incorporates a switch 80 which closes whenever the shutter opens. Fig. 4 shows how the wiring that is incorporated in the camera construction is connected to the switch 80 by a plug 82 and further shows the wiring connected to the indicator lamp 52, the multiple element pin connector 54, the exposure switch 55, the rotary solenoid 75 and a rectifier 84.

As shown in FIG. 5 and indicated diagrammatically in FIG. 14, the camera proper has a body made in two telescoping sections comprising a rearward outer cylinder 85 and a forward inner cylinder 86 which carries the lens board 76 and the lens 35. The forward end of the outer cylinder 85 is formed with an inner circumferential radial flange 88 which is formed with an inner circumferential groove to retain an O-ring 90. The O-ring serves as a light seal and slidingly embraces the inner cylinder 86.

The inner cylinder 86 is formed at its rear end with an outer circumferential radial flange 92 which slidingly fits inside the outer cylinder 85. Three circumferential spaced radial screws 94 mounted in the flange 92 releasably engage the surrounding outer cylinder 85 for the purpose of fixedly interconnecting the two cylinders in a releasable manner at selected positions for selected image ratios.

Mounted on the rear end of the outer cylinder 85 by circumferentially spaced screws 95 is the previously mentioned transverse channel 56 which provides a pair of overhanging rails 96 to receive a film holder. The screws 95 may be removed temporarily for the purpose of rotating the channel 56 for the purpose of turning the film 90° when desired. As best shown in FIG. 16 the channel 56 is provided with a circular rib which forms an inner circumferential shoulder 97 at the rear end of the outer cylinder 85.

As shown in FIG. 5 the rear cylinder 85 of the camera body is mounted in a circular opening 98 in the rear wall 100 of the auxiliary clamp housing 32, and the circular opening is provided with a light seal in the form of a lip 102 of a ring of rubber-like material. The camera body cylinder 85 is movably mounted in the auxiliary clamp housing 32 to slide along a pair of opposite tracks 104 that are rigidly mounted inside of the auxiliary clamp housing as shown in FIG. 4. For cooperation with the tracks 104, the outer camera cylinder 85 is provided with two diametrically opposite guide channels 105 with overhanging side walls 106. Each of the four side walls 106 confine two rows of balls 108 to minimize the frictional resistance to movement of the camera cylinder relative to the auxiliary clamp housing. One side of one of the channels 105 is provided with a longitudinal rack 110 the teeth of which are engaged by a pinion 112 that is operated by the previously mentioned focus knob 48. Thus rotation of the focus knob 48 shifts the camera longitudinally as required for focusing on the CRT screen. A suitable scale 113 (FIG. 5) is provided inside the upper guide channel 105. This scale is a useful index for recording various focus adjustments of the camera.

THE POLARIZING FILTERS

The advantage of using the two polarizing screens may be understood by referring to FIG. 6 which shows diagrammatically a camera 34a with a lens 35a and containing a film 114. The camera 34a is mounted on the casing 115 of a cathode-ray tube 116 by means of the usual clamp housing 30a. A graticule 118 placed in front of the screen of the cathode-ray tube provides ruled lines for the background of the phenomena on the screen. The cathode-ray tube casing 115 contains the usual amplifier 120 equipped with vacuum tubes and also contains lamps 122 to illuminate the graticule.

The clamp housing 30a is provided with the usual viewing port 45a which is enclosed by a "periscope" 123 of yielding rubber-like material which is intended to make close contact with the operator's face to keep light out of the clamp housing. When necessary a flap 124 is swung downward to close the viewing portion 45a to keep out the ambient light.

Since the CRT image is an illuminated image, extraneous light falling on the CRT screen lightens the background of the CRT phenomena and thus weakens the image by reduction in contrast. As for the film 114 in the camera, extraneous light entering the lens causes overall fogging and, in addition, ghost images of bright reflections may appear on the film as well as reflections from the metal parts surrounding the cathode-ray tube. These difficulties seriously affect the film even when a single frame of film is exposed only once. When multiple exposures are used to produce multiple photographs on a single film, all of these effects become intolerably accumulative.

The soft rubber periscope 123 is intended to remove these difficulties by cutting off extraneous light. At best, however, it does not make light-proof contact with the observer's face. The observer cannot wear eyeglasses when using the periscope. The observer is limited to a fixed viewing distance and the viewing angle is so narrow as to prevent observation of the full area of the CRT screen. Only one person at a time can use the periscope to observe phenomena on the CRT screen and a further disadvantage is that the operator must remember to close the flap 124 whenever the periscope is not in use.

FIG. 7 shows how, in accord with the teachings of the present invention, the lens 35 of the camera 34 is provided with a polaroid filter 125 and the viewing port 45 is provided with a second polarizing filter 126. The two polarizing filters 125 and 126 polarize the light in opposite respects in the sense that they cooperate for reduction to the minimum of the light that is transmitted through both filters. Thus if linear polarizing filters are employed they are oriented at right angles relative to each other for maximum cooperation to reduce the transmitted light or if the two filters are designed for circular polarization they are selected for polarization in opposite rotary directions. 32% and 22% transmission polarizing filters are both satisfactory.

The environmental light that is admitted to the clamp housing 30 through the polarizing filter 126 is greatly diminished and therefore the contrast on the CRT screen is not significantly reduced. The diminished light admitted to the interior of the clamp housing makes exceedingly weak reflections on metal surfaces around the cathode-ray tube and these weak reflections are diminished by polarizing filter 125 to an intensity well below the threshold of response of the film 114.

Since the two polarizing screens cooperate to eliminate the necessity for cutting off environmental light from the viewing port 45 they not only eliminate the need for the usual periscope 123 but also eliminate the need for a flap to close the viewing port. Since it is not necessary to provide for mounting a closure flap across the inside of the viewing port 45, the viewing port may be widened to substantially the full width of the clamp housing 30. Two or more persons may observe the CRT phenomena through the polarizing screen 126 and each person can choose a preferred viewing distance.

THE DATA RECORDING CHAMBER

FIG. 8 shows how a data card 128 with data marked thereon may be inserted behind the flexible metal plate 68 of the data recording chamber 66. The wall of the data recording chamber 66 is provided with a rectangular window 130 which exposes the data on the card 128 to illumination by lamp means inside the data recording chamber. As best shown in FIG. 9 a pair of lamps 132 may be employed at the opposite ends of an inclined mirror 134. The two lamps 132 may be energized by a pair of dry cells 135 under control of the previously mentioned data exposure switch 70 (FIG. 2). If desired, however, the two lamps 132 may be energized and controlled by circuitry that may be connected to the data recording chamber by means of the previously mentioned pin connector fitting 74 (FIG. 3).

The image of the data is reflected by the mirror 134 through a port 136 into what may be termed a periscope 138 that extends into the interior of the film adapter 38 between the film 114 and the previously mentioned dark slide 65. The periscope 138 extends close to the film to confine the light that is employed to print the data. The beam of light reflected from the mirror 134 passes through a lens 140 in the periscope 138 and is reflected by a second mirror 142 onto the film 114.

A feature of the invention is that the interior of the data recording chamber is provided with a bracket 144 to hold one or two neutral density filters 145, a portion of the data recording chamber being removable for access to the bracket. The following table shows the degrees of neutral density that can be obtained by using one or two filters in the bracket 144 and shows the corresponding data exposure periods for films of different emulsion speeds.

*Data Exposure Time in Seconds for Various Films*

| Total Filter ND in Path of Optics | ASA Emulsion Speed of Film | | | | | | | |
|---|---|---|---|---|---|---|---|---|
| | 50 | 100 | 200 | 400 | 800 | 1,600 | 3,000 | 10,000 |
| 0 | 7 | 3½ | 2 | 1 | ½ | ¼ | ⅒ | ⅟25 |
| .30 | | 7 | 3½ | 2 | 1 | ½ | ¼ | ⅒ |
| .60 | | | 7 | 3½ | 2 | 1 | ½ | ⅕ |
| 1.00 | | | | 7 | 3½ | 2 | 1 | ⅖ |
| 1.30 | | | | | 7 | 3½ | 1½ | ¾ |
| 1.60 | | | | | | 7 | 3½ | 1½ |
| 2.00 | | | | | | | 7 | 3 |
| 2.30 | | | | | | | | 6 |

It may be noted that filters may be proved to extend the data exposure time to 6 or 7 seconds. Such an extended exposure period is useful because it may be counted mentally with reasonable accuracy. It is also to be noted that the data exposure periods may be cut to 1 second or less for those occasions when it is desirable to have the data recording occur simultaneously with the exposure of the film. Thus with a film speed of 3000 the camera aperture may be adjusted for ⅒ second exposure to photograph an image on the CRT screen and with the shutter mechanism of the camera causing the data recording chamber lamps 132 to be energized simultaneously for ⅒ of a second. The data will be printed on the film in proper balance with the image of the CRT screen. As indicated in the above table no neutral density filters are employed in the bracket 144 in this particular instance. If an exposure of ½ second is used, for example, one or two filters providing a neutral density of 0.60 will be used in the data recording chamber.

Since the data recording chamber 66 lies entirely outside the film adapter 38 with only the relatively narrow periscope 138 extending into the film adapter, the data printing is accomplished behind the dark slide 65 without the necessity of interposing the data recording chamber itself between the dark slide and the film.

FIG. 10 is a photograph of a CRT trace 146 with data 147 printed in the upper left hand corner. One advantage of the described structure for printing such data is that the data may be printed relative to the trace 146 in any selected one of the four corners of the photograph. Thus merely reversing the position of the film adapter 38 in the transverse guide channel 56 on the back of the camera shifts the data from one corner of the frame diagonally to the opposite corner. The data may be shifted to either one of the other two corners by temporarily removing the previously mentioned screws 94 (FIG. 16) and rotating the transverse channel 56 through an angle of 90°.

IMAGE RATIO ADJUSTMENT

FIG. 11 shows the dimensional relationships required for the camera to produce an image ratio of 1.0, i.e., to make the film image of a CRT trace exactly equal in size to the actual trace on the CRT screen. The distance between the film 114 and the lens 35 is 2F, i.e., twice the focal length of the lens and the distance from the lens to the subject or the graticule is the same distance, the total distance from the film to the subject being 4F or four times the focal length of the lens.

FIG. 12 shows the dimensional relationship required for an image ratio of 0.5. The distance from the film to the lens is one-half the distance from the lens to the subject, the first distance being one and one-half the focal length of the lens and the second distance being three times the focal length of the lens. The total distance between the film and the subject is now increased to four and a half times the focal length of the lens.

It can be seen that the change from the adjustment of the camera for the 1.0 image ratio to the adjustment for the 0.5 image ratio requires that the film be shifted rearward a distance of half the focal length of the lens and that the lens itself must be shifted rearward by the full focal length of the lens. The film is shifted rearward by moving the camera bodily rearward a distance of one-half the focal length of the lens and, of course, the bodily movement of the camera carries the lens rearward by the same distance. The lens, however, must move rearward an additional distance of one-half the focal length of the lens and this must be accomplished by the camera contracting in length from an extended dimension of twice the focal length of the lens to a contracted dimension of one and one-half times the focal length of the lens. Thus the camera must be capable of contracting by 25% of its fully extended length.

If the camera is to consist of two telescoping parts and is to extend from a minimum overall length of 1½F to 2F, the two telescoping parts must overlap adequately when the camera is fully extended for the necessary rigidity of the camera and for effective sealing against entry of light. The problem of structurally relating the two telescoping camera parts for this purpose arises because so little of the dimension of 1½ times the focal length of the lens is actually available for overlap when the camera is fully extended. This problem may be appreciated when analyzed in terms of millimeters.

With a 75 mm. lens the distance between the film and the lens for a 1.0 image ratio is twice the focal length or 150 mm. and for an image ratio of 0.5 the distance is 1½F or 112½ mm. For maximum capacity of expansion and contraction, the two telescoping parts must both be equal to the contracted dimension, i.e., 112½ mm. Unfortunately the two telescoping parts must be much less in length than 112½ mm. and still be capable of expansion by 37½ mm. This fact which creates the whole problem may be understood by referring to FIG. 13.

As indicated in FIG. 13, the lens 35 must be set forward of the forward end of the camera by the distance $x$ because of the construction and dimensioning of a conventional oscilloscope camera lens and because a liberal tolerance must be allowed in view of variations among lenses. Dimension $x$ is approximately 10 mm. In addition the dimension $y$ must be provided for the depth of a standard roll film adapter as well as the depth of the channel member to hold the adapter with suitable provision for rotation of the channel chamber through 90° when desired.

The depth of a standard roll film adapter measured to the film plane is approximately 34 mm. and the necessary allowance for the channel member in which the roll film adapter is slidingly mounted is approximately 18 mm. The total dimension of $y$, then, is approximately 52 mm. It is apparent that the length of each of the two telescoping body sections of the camera must be reduced to $112½ - (x+y) = 112½ - 62 = 50½$ mm. If two telescoped body sections each 50½ mm. long are to cooperate for expanding by a distance of 37½ mm., the dimension left for overlap when the two sections are fully extended is $50½ - 37½ = 13$ mm.

It is the difficulty of providing a rigid light-tight adjustable telescoping joint with only this scant overlap of the telescoping parts that has heretofore made necessary either the use of interchangeable lenses for different image ratios or, more commonly, the use of spacers, i.e., removable body sections. FIG. 6, for example, shows a body section 150 that is inserted into the camera body for a 1.0 image ratio and is removed for a 0.5 image ratio.

The success of the invention in this respect is in the use of the cooperating radially overlapping flanges 88 and 92 at the inner ends of the two telescoped cylindrical camera body sections 85 and 86. When the camera is fully extended these two flanges may firmly abut each other to promote the rigidity of the adjustable joint. The two flanges provide a circuitous light path which is effectively sealed by the O-ring 90 in one of the two flanges. The other flange provides adequate thickness of material for the radial screws 94 that releasably fix the two camera body sections at selected image ratios.

FIG. 15 shows one of a pair of rectangular spacer gages 148 that may be used to facilitate adjusting the two telescoping body sections for image ratios intermediate the two extreme of 1.0 and 0.5. To make such a camera adjustment, the three radial screws 94 (FIG. 14) are loosened inside the inner cylindrical body section 86 and then the two body sections are telescoped to the desired degree with the pair of spacer gages at diametrically opposite positions. Full access to the interior of the camera for this purpose is achieved by simply removing the releasably mounted roll film adapter 38. With one edge of a spacer gage 148 abutting the inner circumferential shoulder 97 as shown in FIG. 14, the two camera body sections are collapsed until the inner end of the inner body section 86 abuts the opposite edge of the spacer gage. The radial screws 94 are then tightened. In this manner the two oppositely positioned spacer gages 148 cooperate not only for determining the degree of collapse but also for placing the two body sections in axial alignment to insure that the lens board 76 of the camera is perpendicular to the camera axis. With the inner circumferential shoulder 97 and the inner end of the inner body section 86 chamfered or undercut to tapered configuration and with the edges of the spacer gages 148 correspondingly tapered, the two spacer gages are effectively trapped and, in effect, become part of the camera structure to contribute to the rigidity of the sectionalized camera body. As indicated by indicia on each spacer gage 148 and shown in FIG. 15, the long dimension of the rectangular spacer gages is used for the 0.9 image ratio and the shorter dimension is used for the 0.7 image ratio.

FIG. 17 shows an alternate spacer gage 149 in the form of a longitudinally split cylinder. One such spacer gage is used for the 0.7 image ratio and another of greater axial dimension is used for the 0.9 image ratio. The spacer gages 150 are preferably biased to resiliently spread radially outward against the inner circumference of the outer body section 85 in the manner of a leaf spring. Here again the spacer gages 150 may be left in position to contribute to the rigidity of the sectionalized camera body.

THE ELECTRICAL COMPONENTS ON THE CAMERA

FIG. 18 indicates by a rectangle the multiple pin electrical connector fitting 54 on the camera (FIG. 3) and indicates by a second rectangle a complementary multiple socket connector fitting 152, the pin fitting 54 plugging into the socket fitting 152. FIG. 18 indicates by letters A–F the six pins on the pin connector 54 and the corresponding six sockets on the complementary socket connector 152. FIG. 18 further shows the indicator lamp 52 (FIG. 3), the exposure switch 55 (FIG. 3), the solenoid 75 (FIG. 4) that actuates the shutter of the lens 35, the rectifier 84 (FIG. 4) and the switch 80 (FIG. 4) that is incorporated in the camera shutter mechanism to close whenever the camera shutter opens.

One side of the exposure switch 55 is connected to the pin A and the other side is connected both to the pin C and to one side of the solenoid circuit. The second side of the solenoid circuit is connected to pin B. One side of the indicator lamp 52 is connected to the pin D and the other side is connected both to the pin F and to one side of the shutter switch 80. The second side of the shutter switch 80 is connected to the pin E.

In FIG. 18 the complementary multiple socket connector fitting 152 is connected to a cable having six wires 153–158. Wires 153 and 154 plug into a source of 110 volt alternating current and are connected respectively to sockets A and B. Wire 155 is connected to socket C and one side of a remote control switch 160, the second side of the remote switch being connected to the wire 153. Wire 157 connects socket E with one side of a remote source of 6 volt direct current and the second side of the source is connected to one side of a remote relay 162 and is also connected by the wire 156 with the socket D. The second side of the remote relay 162 is connected to the socket F by the wire 158.

The shutter of the camera may be operated either by the exposure switch 55 on the camera or by the remote control switch 160. Whenever the shutter operates, i.e., opens, it closes the switch 80 to energize the indicator lamp 52 on the camera and also to energize the remote relay 162. The remote relay 162 may be used to control a phenomenon that is to be photographed.

In FIG. 19 the only change on the camera is that a relay 164 is mounted on the camera to close the data recording circuit that includes the lamp 132 and the batteries 135. One side of this relay is connected to the pin F and the other side is connected to the shutter switch 80.

The multiple socket connector fitting 152 is connected to a cable having four wires 153, 154, 155 and 165. The three wires 153, 154 and 155 are hooked up in the same manner as in FIG. 18 but wire 153 is connected adjacent the camera both to socket A and to socket D and wire 154 is connected adjacent the camera both to socket B and to socket E. The fourth wire 165 is connected to one side of a remote indicator lamp 166 the second side of the remote indicator lamp being connected to the wire 153.

In FIG. 19 the shutter may be actuated either by the exposure switch 55 at the camera or the remote exposure switch 160. In either event the data is exposed simultaneously with the opening of the camera shutter and both the indicator lamp 52 on the camera and the remote indicator lamp 166 are energized during the period that the camera shutter is open.

In FIG. 20 the connector pins D, E and F and the sockets D, E and F are idle. The pins A, B, C of the connector fitting on the camera are connected to the exposure switch 55 and the shutter solenoid 75 in the same manner as in FIGS. 18 and 19. The shutter switch 80 is connected to the data exposure circuit including the battery means 135 and the lamp means 132. The three sockets A, B and C of the complementary socket connector fitting 152 are connected to a cable comprising wires 153, 154 and 155 which are hooked up in the same manner as in FIGS. 18 and 19. The camera may be controlled either by the exposure switch 55 at the camera or by the remote exposure switch 160. In either event the opening of the shutter of the lens 35 causes simultaneous recording of data on the film.

It is apparent from a consideration of FIGS. 18, 19 and 20 that the provision of the multiple pin electrical connector 152 on the camera together with the other electrical components on the camera, make the camera exceptionally flexible with respect to modes of control. It is a simple matter for the user to change the wiring on the camera from any one of the arrangements to another. It is a simple matter to provide the complementary multiple socket connector fitting 152 for the remote control wiring shown in any one of FIGS. 18, 19 and 20.

Our description in specific detail of the invention by way of illustration will suggest various changes, substitutions and other departures from our disclosure within the spirit and scope of the appended claims.

We claim:

1. In combination:
   a housing;
   an oscilloscope facing into the housing;
   a camera facing into the housing to photograph traces on the screen of the oscilloscope,
   said camera having a rear body section and a forward body section, said rear body section being adapted to carry a film at its rear end;
   a lens on the forward end of the forward section,
   the inner ends of the two sections being telescoped together for adjustable extension and contraction of the two sections for selected image ratios within the range of 0.5 and 1.0,
   one of said two sections being of uniform outside dimension and the other of said two sections having an inner circumferential flange on its inner end conforming to the outer surface of said one section throughout said range,
   said one section having an outer circumferential flange on its inner end and said other of said two sections being of uniform inside dimension with its inner surface conforming to said outer circumferential flange throughout said range;
   an O-ring mounted on the peripheral edge of one of said circumferential flanges for sliding contact with the corresponding cooperating surface; and
   releasable means normally fixedly interconnecting the two sections to maintain the two sections at selected longitudinal positions relative to each other for producing selected image ratios, said releasable means being carried by the other of said two circumferential flanges and extending radially therethrough for engagement with the corresponding cooperating surface to immobolize the two sections relative to each other,
   one of said two sections being mounted on said housing for longitudinal movement relative thereto for bodily shift of the two sections in unison through a range of film-to-screen distances to focus on the screen of the oscilloscope.

2. A combination as set forth in claim 1 in which said releasable means comprises a plurality of circumferentially spaced screws mounted in said outward circumferential flange to exert radially outward pressure against said inner surface of said other of the two sections.

3. In a camera facing into a housing to photograph traces produced on a screen of an oscilloscope facing into the same housing, the combination of:
   a rear camera body section adapted to carry a film at the rear end thereof;
   a forward camera body section with a lens on the forward end thereof,
   the inner ends of the two sections being telescoped together for adjustable extension and contraction of the two sections for image ratios selectively within said range of 0.5 and 1.0,
   said two sections having respectively two shoulders facing towards each other;
   removable spacer means lying against the circumferential surface of one of said body sections between said two shoulders;
   and means positively interconnecting the two body sections and holding said shoulders in firm abutment against said spacer means to make the two sections rigid relative to each other and to fix the film-to-lens distance for a predetermined image ratio.

4. A combination as set forth in claim 3 in which said two shoulders are undercut to trap the spacer means in a positive manner.

5. A combination as set forth in claim 3 in which said interconnecting means is releasable and adapted to immobilize the two sections at selected relative positions whereby spacer means of one effective dimension may be substituted for another spacer means of another effective dimension to vary the predetermined image ratio.

6. A combination as set forth in claim 3 in which said spacer means comprises at least one member with two pairs of parallel edges of different spacing for use selectively of the two pairs of parallel edges to predetermine two different selected image ratios.

7. A combination as set forth in claim 3 in which said spacer means is a split ring member.

8. In a camera, the combination of:
   a rear camera body section adapted to carry a film at the rear end thereof;
   means rigidly supporting the rear section;
   a forward camera section with a lens on the forward end thereof,
   said two sections being telescoped together for contraction to a relatively small overall length with relatively great overlap of the two sections for support of the forward section over a relatively great proportion of the length of the rear section and extension to a relatively great overall length of substantially less overlap of the two sections for less effective support of the forward section over a less proportion of the length of the rear section; and
   releasable rigid spacer means extending from a rear portion of the rear section to a rear portion of the forward section to reinforce the forward section when the two sections are extended to an intermediate overall length, thereby to utilize an additional proportion of the length of the rear section for rigid support of the forward section.

9. In combination:
   a housing;
   an oscilloscope facing into the housing;
   a camera facing into the housing to photograph traces on the screen of the oscilloscope,
   said camera having a rear body section and a forward body section, said rear body section having a forwardly facing shoulder and being adapted to carry a film at its rear end;
   a lens on the forward end of the forward section,
   the inner ends of the two sections being telescoped together for adjustable extension and contraction of the two sections for selected image ratios within the range of 0.5 and 1.0,
   said forward body section being of uniform outside dimension and said rear body section having an inner circumferential flange on its inner end conforming to the outer surface of the forward body section throughout said range,
   said forward body section having an outer circumferential flange on its inner end parallel with said shoulder and said rear body section being of uniform inside dimension with its inner surface conforming to said outer circumferential flange throughout said range;
   spacer means removably interposed between said shoulder and said outer circumferential flange; and
   releasable means adapted to fixedly interconnect the two sections to maintain said spacer means in firm abutment with said shoulder and with said outer circumferential flange to make the two sections rigid relative to each other and to fix the film-to-lens distance for a predetermined image ratio,
   one of said two sections being mounted on said housing for longitudinal movement relative thereto for bodily shift of the two sections in unison through a range of film-to-screen distances to focus on the screen of the oscilloscope.

References Cited in the file of this patent

UNITED STATES PATENTS

| | | | |
|---|---|---|---|
| 182,117 | Herzog | Sept. | 12, 1876 |
| 270,133 | Schmid | Jan. | 2, 1883 |
| 828,538 | Davis | Aug. | 14, 1906 |
| 2,046,580 | Premo | July | 7, 1936 |
| 2,052,261 | Verschoor | Aug. | 25, 1936 |
| 2,073,314 | Mihalyi | Mar. | 9, 1937 |
| 2,126,300 | Wittel | Aug. | 9, 1938 |
| 2,362,814 | Gorey | Nov. | 14, 1944 |
| 2,376,993 | Evans | May | 29, 1945 |
| 2,907,255 | Meixner | Oct. | 6, 1959 |
| 3,011,416 | Hammer | Dec. | 5, 1961 |
| 3,044,068 | Hull | July | 10, 1962 |